United States Patent [19]

Bouchard

[11] Patent Number: 4,598,230

[45] Date of Patent: Jul. 1, 1986

[54] COMPACT FLUORESCENT LAMP HAVING THERMALLY ACTUABLE MEANS

[75] Inventor: Andre C. Bouchard, Peabody, Mass.

[73] Assignee: GTE Products Corporation, Stamford, Conn.

[21] Appl. No.: 591,743

[22] Filed: Mar. 21, 1984

[51] Int. Cl.⁴ .................. H01J 61/28; H01J 61/34
[52] U.S. Cl. .................................. 313/493; 313/610; 445/57
[58] Field of Search .............. 313/13, 493, 148, 151, 313/634, 22, 24, 318, 610; 236/48 R; 174/17 UA; 445/57

[56] References Cited

U.S. PATENT DOCUMENTS

| | | | |
|---|---|---|---|
| 1,955,560 | 4/1934 | Payne | 313/13 |
| 3,799,432 | 3/1974 | Schneider | 236/48 R |
| 4,527,089 | 7/1985 | Bouchard et al. | 313/493 |

Primary Examiner—Palmer C. DeMeo
Assistant Examiner—Sandra L. O'Shea
Attorney, Agent, or Firm—William H. McNeill; Carlo S. Bessone

[57] ABSTRACT

Compact fluorescent lamps employ inner assemblies of fluorescent tubes mounted in an arc tight manner. Associated with the assemblies are thermally actuable means which operate to open communication with the tubes during exhaust. After exhaust and sealing of an outer envelope which holds the assembly, the thermally actuable means closes the tubes to form an arc tight seal.

7 Claims, 8 Drawing Figures

COMPACT FLUORESCENT LAMP HAVING THERMALLY ACTUABLE MEANS

CROSS REFERENCE TO RELATED APPLICATION

This application discloses information claimed in U.S. Ser. No. 591,744, filed concurrently herewith, and assigned to the assignee of the instant application.

TECHNICAL FIELD

This invention relates to fluorescent lamps and more particularly to compact versions of such lamps having utility as replacements for incandescent lamps. Still more particularly the invention relates to improvements in such lamps which result in easy processing and better arc control.

BACKGROUND ART

The fluorescent lamp is the most widely utilized light source in the world for general illumination, primarily because of its relatively low initial cost and its efficacy: i.e., its light output relative to its power input, usually expressed as lumens per watt (LPW). Nevertheless, for home use, the fluorescent lamp has not taken precedence over the incandescent lamp. Many reasons have been advanced for this lack of acceptance, among them the poor color rendition of some fluorescent lamps and their need for a ballast. However, one of the major disadvantages lies in the fact that a fluorescent lamp is a linear light source whereas an incandescent lamp can almost be considered a point source. The typical fluorescent lamp has a length of from 18" to 8' and is somewhat cumbersome to work with.

With the increasing cost of energy, attempts have been made to overcome the latter difficulty. One of these attempts has utilized a plurality of fluorescent tubes having one or more smaller tubes connecting the ends of the fluorescent tubes to provide an arc path. Such lamps are shown in U.S. Pat. No. 3,501,662. Large, "U" shaped lamps such those shown in U.S. Pat. Nos. 3,602,755; and 2,401,228; and triple bend lamps such as shown in U.S. Pat. No. 4,347,460 exemplify other attempts.

Still other attempts are shown in U.S. Pat. Nos. 4,208,618; 4,191,907; and 4,524,301, filed Sept. 30, 1982 and assigned to the assignee of the instant invention; and U.S. Pat. No. 4,527,088 filed Apr. 1, 1983 and assigned to the assignee of the instant invention. p While each of these proposals has its own advantages, disadvantages also exist. The previous forms of multiple tubing lamps are expensive to produce and difficult to handle during manufacture.

Many types require expensive, custom made partitions and/or require large numbers of hermetic seals. Multiple bend tubes require large outlays for manufacturing equipment which adds to the cost of the final lamp.

Yet another type of compact light source is exemplified by a fluorescent lamp comprising a hermetically sealed outer envelope containing an arc generating and sustaining medium. Positioned within this outer envelope is an assembly comprised of a plurality of elongated glass tubes coated on their interior surface with a phosphor. All of the interior surfaces are open to the medium. The tubes have first and second ends and the assembly has first and second arc directing means operatively associated with the first and second ends of the tubes to provide a continuous arc path therethrough. An electrode is positioned at both ends of the arc path and means are provided for making electrical connection to the electrodes.

In an alternate embodiment, the assembly comprises a pair of U shaped tubes each having an electroded end and an open end. An arc directing means is operatively associated with the ends of the tubes and includes an arc director which connects the open end of the tubes.

Compact fluorescent lamps built according to the above provide many improvements over the prior art. Custom-made partition structures are avoided as are multiple hermetic seals. Also, since either straight tubing or simple Y shaped tubes are employed, complex machinery for making multiple bends is also obviated.

The latter two lamps are disclosed in U.S. Pat. No. 4,527,089, filed Apr. 1, 1983 and assigned to the assignee of the instant invention.

It would be an advance in the art to provide simple, economical and efficient arc directing means for use with compact fluorescent lamps which are simple and easy to evacuate and fill and have better arc control than those described above.

DISCLOSURE OF THE INVENTION

It is, therefore, an object of the invention to obviate the disadvantages of the prior art.

It is another object of the invention to provide an arc discharge lamp that is easy to evacuate and fill.

These objects are accomplished, in one aspect of the invention, by including with an assembly of arc discharge tubes mounted within an outer envelope, thermally actuable means which are operable to open communication with the interior of the tubes upon the application of heat thereto. Removal of the heat allows the thermally actuable means to close and form an arc tight seal for the tubes.

Employment of the thermally actuable means allows faster, easier and more complete evacuation and filling of lamps while at the same time providing better arc control and faster starting.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
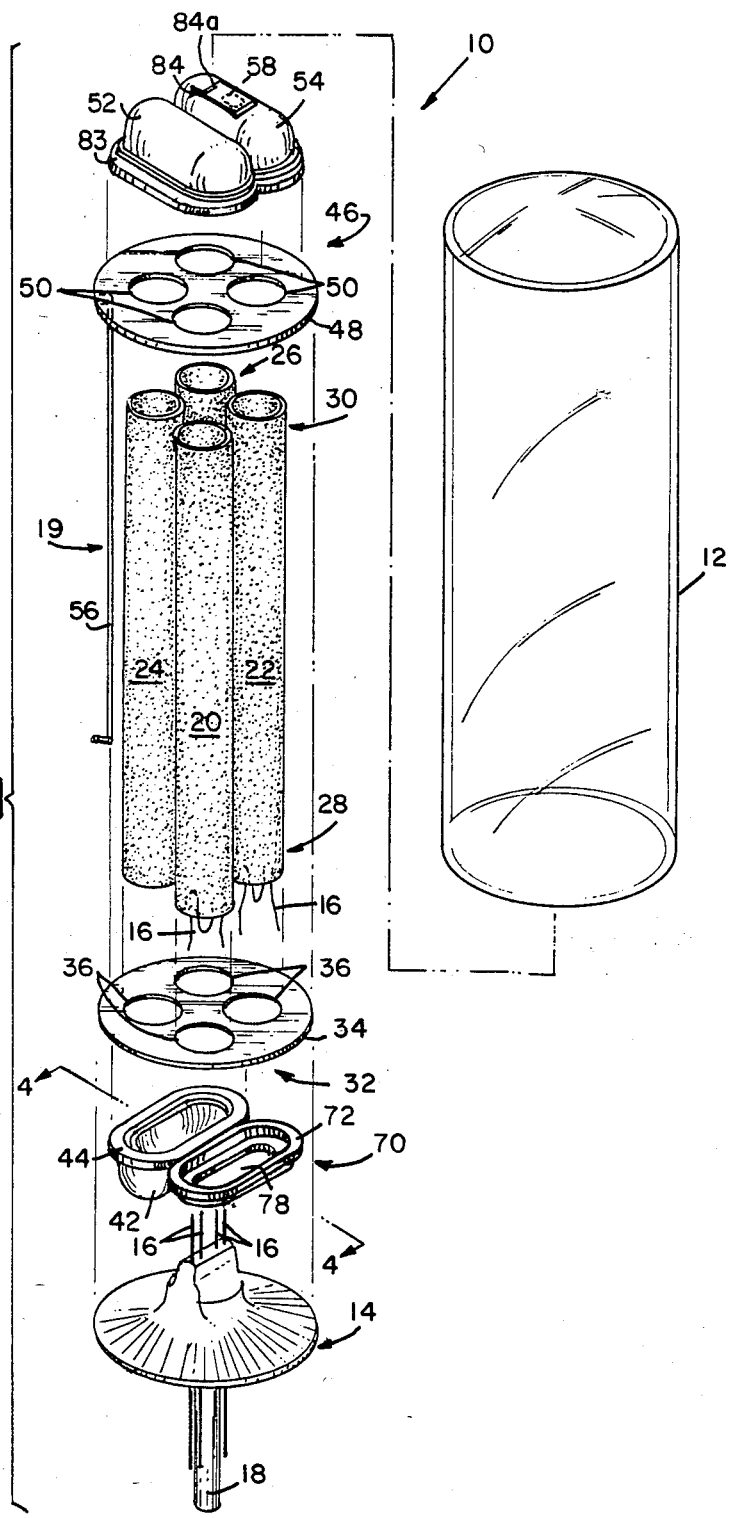
FIG. 1 is an exploded, perspective view of a lamp in which the invention can be employed.

Referring now to the drawings with greater particularity, there is shown in FIG. 1 a compact fluorescent lamp 10 having an outer, light-transmissive, glass envelope 12 which is hermetically sealed to a flare 14 which includes lead-in wires 16 and an exhaust tubulation 18. An arc generating and sustaining medium, e.g., about 20 mg of mercury and argon at a pressure of 3 torr, is provided within envelope 12.

Also positioned within envelope 12 is an assembly 19 comprised of a plurality of elongated tubes 20, 22, 24 and 26 each having first ends 28 and second ends 30. The tubes are coated on their interior surface with a suitable U.V. excitable phosphor, e.g., a calcium halophosphate activated by antimony and manganese, or any operative phosphor or combination of phosphors. The phosphor can be applied by any suitable method, including those used to coat conventional fluorescent tubes.

In a preferred embodiment, the tubes 20, 22, 24 and 26 are formed from T5 tubing and are four inches (approx. 10.16 cm) long. For ease in coating, a single, long tube, say three feet long, can be coated and subsequently cut into appropriate lengths. The cut ends of the tubing should be lightly fire polished.

A first arc directing means 32 is associated with first ends 28 of tubes 20, 22, 24 and 26, and comprises a first base member 34 having apertures 36 therein for receiving the first ends 28 of the tubes.

Figure 2:
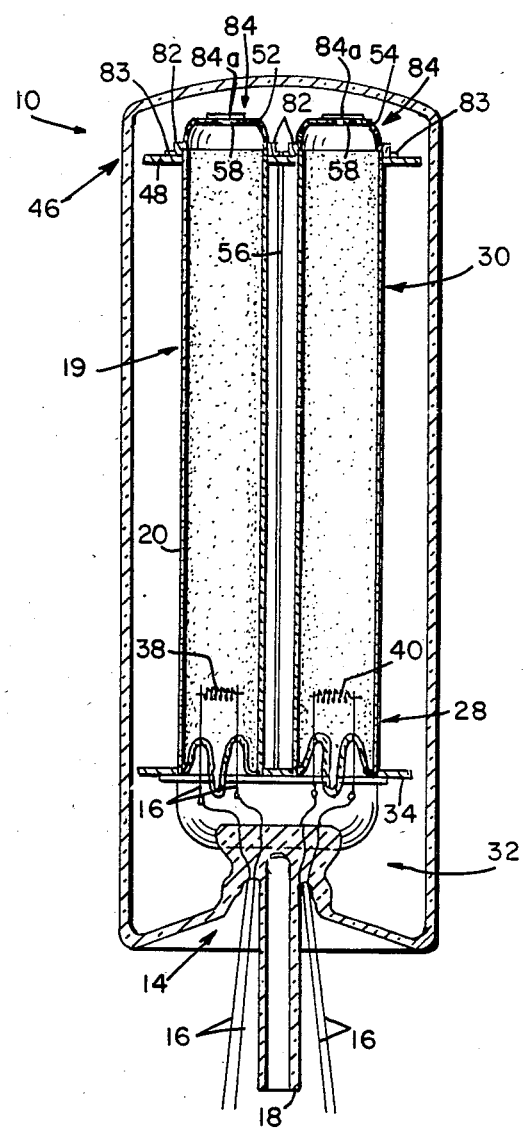
FIG. 2 is a sectional, elevational view of the embodiment of FIG. 1.

Two of the tubes, e.g., 20 and 22, have their first ends 28 provided with electrodes 38 and 40, respectively (see FIG. 2). While these electrodes may be sealed into the tube ends in a conventional manner for convenience in handling, it is not necessary that a hermetic seal be formed, and the electrodes may be mounted within the tubes in any desired manner.

A single arc director 42 is positioned on the underside of first base member 34 and covers the apertures into which the first ends 28 of tubes 24 and 26 are fitted. As shown, arc director 42 is in the form of a rectangular dish having a peripheral rim 44 about its open side. The arc director 42 is affixed to the underside by any suitable means, if it is formed separate from first base member 34, although the entire arc directing means 34 can be formed as a one piece unit.

A second arc directing means 46 is associated with the second ends 30 of tubes 20, 22, 24 and 26 and comprises a second base member 48 having apertures 50 therein for receiving the second ends 30 of the tubes.

The upper side of second base member 48, i.e., the side remote from the tubes, has two arc directors 52 and 54 positioned thereon. The arc directors 52 and 54 can be of the same construction as arc director 42. Arc director 52 encompasses the apertures receiving the second ends 30 of the tubes 20 and 24; and arc director 54 encompasses the apertures receiving the second ends 30 of the tubes 22 and 26.

A connecting rod 56 of, e.g., steel, extends between the first base member 34 and the second base member 48 and is affixed thereto, as by welding, thus securing the assembly 19 together as a unit.

The fit between the various ends of the tubes within the apertures of the base members is merely a mechanical one that is characterized as being arc tight but permeable to the arc generating and sustaining medium that is present within the hermetically sealed outer envelope 12. To aid in evacuating and to insure that the medium penetrates within the tubes, at least one of the arc directors, e.g., 54, is provided with an exhaust port 58 therein.

A thermally actuable means 84 is associated with port 58 and, in a preferred embodiment, comprises a tri-metallic snap-action blade 84a having one end permanently affixed to arc director 54, as by welding.

Figure 3:
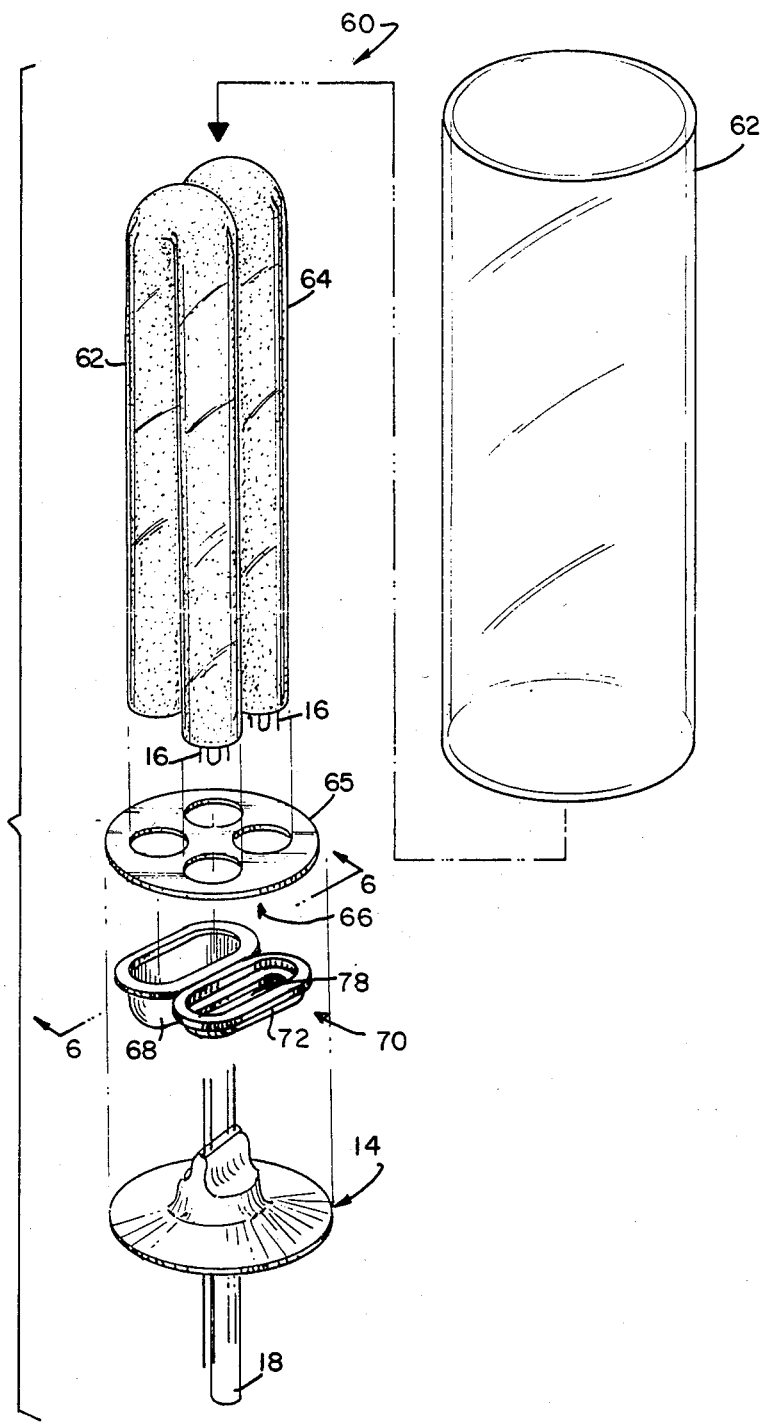
FIG. 3 is an exploded, perspective view of an alternate lamp in which the invention can be employed.
Figure 6:
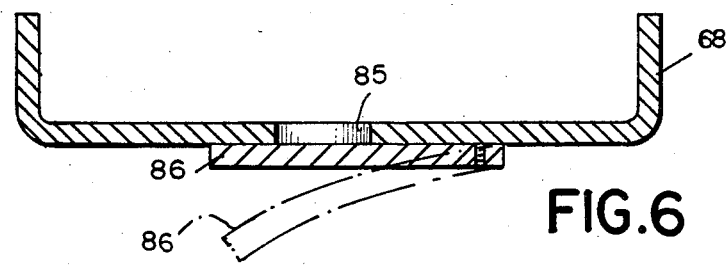
FIG. 6 is an enlarged sectional view taken along the line 6—6 of FIG. 3 illustrating the invention.

An alternate construction for the lamp is shown in FIG. 3 wherein lamp 60 is substantially similar to lamp 10 except that two U shaped tubes 62, 64 are employed. In the latter embodiment, only one arc directing means 66 is necessary. Arc directing means 66 can be constructed similar to arc directing means 32. Lamp 60 has the additional advantage of providing light from the U bends. Electrodes are provided in adjacent ends of the U tubes and the arc director 68, which is mounted upon base member 65, connects the open, or un-electroded, ends. Arc director 68 is provided with an exhaust port 85 and thermally actuable means 86 (see FIG. 6).

Figure 4:
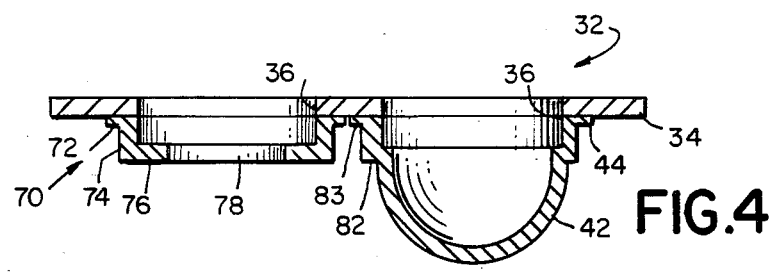
FIG. 4 is an enlarged, sectional view of an arc directing means taken along the line 4—4 of FIG. 1.

Referring now to FIG. 4, arc directing means 32 (or 66 of FIG. 3) has first base member 34 formed from relatively thick, rigid, electrically conductive material, e.g., cold rolled steel. The thickness is preferably about 0.024 inches and the diameter is sized to fit within outer envelope 12 or 62. Some of the apertures 36 therein include electrode receiving means 70. The electrode receiving means 70 comprises a peripheral rim 72 having an upstanding wall 74 with an inwardly projecting shoulder 76. The inner edge of shoulder 76 defines a rectangular opening 78 through which project the electrode lead-in wires 16 and exhaust tubulations 80, if they are provided (see FIG. 5). The shoulder 76 seats the first ends 28 of electroded tubes 20 and 20 as they are fitted within apertures 36. Attachment of receiving means 70 to base member 34 is by any suitable means, preferably, welding of the rim 72 to the base member 34.

Figure 5:
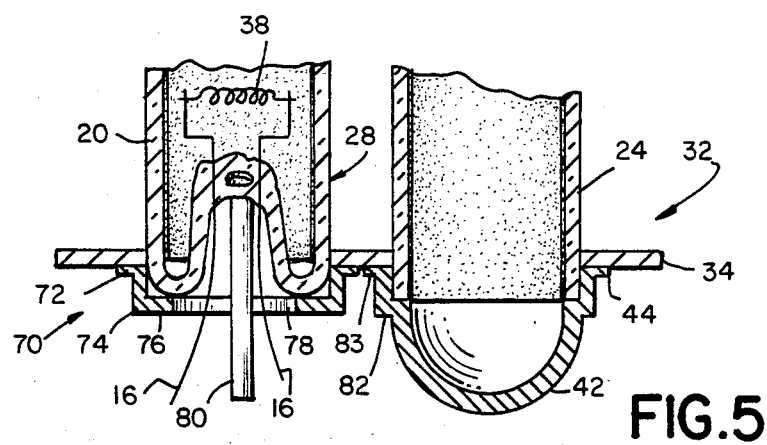
FIG. 5 is a view similar to FIG. 4 showing fluorescent tubes positioned with the arc directing means.

The arc directors 44, 52, 54 and 68 can also be provided with a shoulder 82, as is shown in detail in FIGS. 2, 4, and 5, and also are preferably attached to their respective base members by welding the rims 83 to the base members.

The receiving means 70 and the arc directors 44, 52, 54 and 68 are preferably made from material having a thickness less than one half that of the base members, a preferred material being SAE 1008 steel with a thickness of about 0.010 inches.

The parts are formed in any suitable manner, e.g., the base members and their apertures can be formed by stamping, as can the arc directors. The latter can then be die drawn to the desired shape. The parts are then degreased, e.g., in a vapor degreaser, and are then degassed by vacuum firing for about one hour at about 800° C. After the initial degassing the arc directors and electrode receiving means are attached to the base members, as by welding, and the assembled arc directing means are further degassed by a second firing in vacuum for about 2 hours at about 1000° C. In a preferred embodiment, all parts are nickel plated before firing and assembly.

The arc directing means are then ready to be employed in a compact fluorescent lamp.

Figure 7:
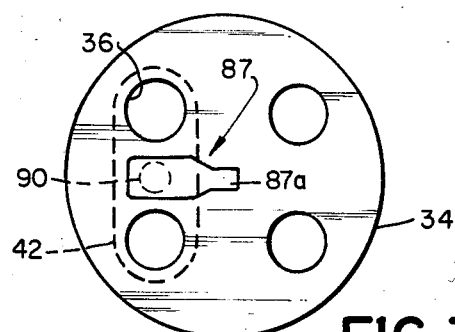
FIG. 7 is a plan view of an alternate embodiment of the invention.

An alternate embodiment of the invention is shown in FIG. 7 wherein a base member (e.g. 34 or 65) has an exhaust port 90 formed therein in communication with arc director 42 (or 68). Thermally actuable means 87 in the form of a snap action blade 87a is attached to the base member and covers exhaust port 90.

Figure 8:
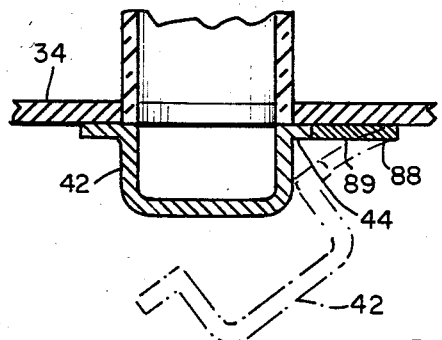
FIG. 8 is a partial, sectional view of yet another embodiment.

Yet another embodiment of the invention is shown in FIG. 8 wherein an arc director, e.g. 42, has thermally actuable means 88 in the form of a thermostatic hinge 89 butt welded to a rim 44 thereof. The other side of the hinge is affixed, as by welding, to a base member, e.g. 34.

After assembly of the components into a unit and the insertion of the unit into envelope 12 (or 62) and the sealing of the envelope to the flare, the lamp is ready for final processing.

During exhaust the lamp temperature is raised to approximately 400° C. At about 200° C. thermally actuable means 84, 86, or 88 will open, thus allowing the interior of tubes 20, 22, 24, 26 or "U" tubes 62, 64 to be thoroughly evacuated. After exhausting, the lamp is allowed to cool until means 84, 86, or 88 closes, at approximately 60° C. The lamp is then flashed with mercury to further remove impurities and is then tipped off after filling with 3 torr argon.

In a preferred embodiment, means 84, 86, or 88 are constructed from a material known as #E-105, which is available from GTE Products Corporation. This material is of three layer construction; the high expansion side being 22% Ni, 3% Cr, and 75% Fe. The low expansion side is 42% Ni and 58% Fe; and the middle layer is 100% Ni. Many other materials can be employed, including bi-metals, so long as they operate within the temperature parameters used in the lamp processing. Further, such materials need not operate as snap-action blades or hinges, although this is preferred, but can operate on a "creep" principle, in the nature of most thermostatic materials.

In operation of the lamp, the arc will proceed, during each half cycle, from electrode 38 up the length of tube 20, across arc director 52, down tube 24, across arc director 42, up tube 26, across art director 54, and down tube 22 to electrode. On the following half cycle, or course, the direction will be reversed.

Lamps constructed as described above have many advantages over those of the prior art. Simple, mechanical joints are employed together with novel arc directors, to form a long arc path in a compact lamp. The lamps can be constructed with a range of tube quantities and tube lengths giving flexibility to the size and output of the lamps.

The lamps can be operated at high electrical loadings because the first arc directing means provide a heat shielding effect, thus allowing the mercury vapor pressure to be held at a lower temperature at the bottom of envelope 12.

The tubes can be constructed from a variety of materials since no seals are required internally.

Because each of the tubes is a separate entity, each of the tubes can have a different phosphor applied thereto, thus allowing for color blending.

Lamps fabricated with the thermally actuable means are observed to start more rapidly and have less arc leakage when compared with lamps where an exhaust port remains open.

Further, the lamps are adaptable to high speed manufacturing techniques because of the mechanical nature of the inner assembly.

While there has been shown what are at present considered to be the preferred embodiments of the invention, it will be apparent to those skilled in the art that various changes and modifications can be made herein without departing from the scope of the invention as defined by the appended claims.

I claim:

1. In a fluorescent lamp having an hermetically sealed outer envelope containing an arc generating and sustaining medium; an assembly positioned within said envelope, said assembly comprising a plurality of elongated glass tubes each hving first and second ends, said tubes being coated on their interior surface with a phosphor, all of said interior surfaces being open to said medium; at least one arc directing means operatively associated with said first ends of said tubes and including an arc director, said arc director forming a part of the arc path through said tubes; an electrode at either end of said arc path, and means for making electrical connection to said electrodes, said arc directing means comprising a relatively thick, rigid, electrically conductive base member having a plurality of apertures therein, some of the apertures including means formed to receive said electrodes and other of said apertures including means formed to receive the first ends of said tubes that do not contain electrodes; said arc director being associated with said other apertures, the improvement comprising: thermally actuable means associated with said assembly operable to open communications with the interior of said tubes upon application of heat thereto; and operable to form an arc tight seal with the interior of the tube upon removal of heat therefrom.

2. The lamp of claim 1 wherein said thermally actuable means comprises a thermostatic material comprised of at least two layers having different coefficients of thermal expansion associated with an exhaust port.

3. The lamp of claim 2 wherein said exhaust port is formed in said arc directing means.

4. The lamp of claim 2 wherein said exhaust port is formed in said arc director.

5. The lamp of claim 2 wherein said thermally actuable means opens at a temperature of about 200° C.

6. The lamp of claim 2 wherein said thermally actuable means comprises a hinge attaching said arc director to said arc directing means.

7. The lamp of claim 2 wherein said thermally actuable means comprises a snap action blade.

* * * * *